(12) United States Patent
Ino

(10) Patent No.: US 9,091,893 B2
(45) Date of Patent: Jul. 28, 2015

(54) METHOD OF MANUFACTURING A DISPLAY DEVICE COMPRISING A STEP OF SIMULTANEOUSLY POLISHING A SECOND SUBSTRATE AND A SEMICONDUCTOR CHIP TO HAVE THE SAME THICKNESS AS EACH OTHER

(71) Applicant: c/o Japan Display West Inc., Aichi (JP)

(72) Inventor: Masumitsu Ino, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/540,391

(22) Filed: Nov. 13, 2014

(65) Prior Publication Data

US 2015/0072475 A1    Mar. 12, 2015

Related U.S. Application Data

(60) Continuation of application No. 14/295,627, filed on Jun. 4, 2014, now Pat. No. 8,917,372, which is a division of application No. 13/588,620, filed on Aug. 17, 2012, now Pat. No. 8,804,089, which is a division of application No. 11/684,867, filed on Mar. 12, 2007, now Pat. No. 8,274,633.

(30) Foreign Application Priority Data

Mar. 14, 2006  (JP) ................. 2006-069539

(51) Int. Cl.
| | |
|---|---|
| G02F 1/1345 | (2006.01) |
| G02F 1/13 | (2006.01) |
| G02F 1/1368 | (2006.01) |
| G02F 1/1339 | (2006.01) |
| G02F 1/1335 | (2006.01) |
| G02F 1/13363 | (2006.01) |

(52) U.S. Cl.
CPC .......... *G02F 1/13454* (2013.01); *G02F 1/1339* (2013.01); *G02F 1/1368* (2013.01); *G02F 1/13363* (2013.01); *G02F 1/133528* (2013.01)

(58) Field of Classification Search
CPC ............................... H01J 9/20; G02F 2201/50
USPC .................................................. 349/150–154
See application file for complete search history.

(56) References Cited

U.S. PATENT DOCUMENTS

| | | | |
|---|---|---|---|
| 5,838,412 | A | 11/1998 | Ueda et al. |
| 6,388,339 | B1 | 5/2002 | Yamamoto et al. |
| 6,897,841 | B2 | 5/2005 | Ino |

(Continued)

FOREIGN PATENT DOCUMENTS

| | | |
|---|---|---|
| JP | 09-146110 | 6/1997 |
| JP | 11-104954 | 4/1999 |

(Continued)

*Primary Examiner* — Paul Lee
(74) *Attorney, Agent, or Firm* — Dentons US LLP

(57) ABSTRACT

A display device including: a first substrate with a pixel switch and drivers mounted thereon; a second substrate disposed in facing relation to the first substrate; a material layer held between the first substrate and the second substrate and having peripheral edges sealed by a seal member, the material layer having an electrooptical effect; and a semiconductor chip mounted as a COG component on the first substrate, the semiconductor chip having a control system configured to control the drivers; wherein the semiconductor chip having a thickness equal to the total thickness of the seal member and the second substrate or larger than the thickness of the seal member and smaller than the total thickness.

1 Claim, 18 Drawing Sheets

(56) References Cited

U.S. PATENT DOCUMENTS

| | | |
|---|---|---|
| 2001/0002855 A1 | 6/2001 | Onisawa et al. |
| 2002/0015005 A1 | 2/2002 | Imaeda |
| 2003/0112403 A1* | 6/2003 | Ino .............................. 349/152 |
| 2004/0252867 A1 | 12/2004 | Lan et al. |
| 2006/0003491 A1 | 1/2006 | Kim et al. |
| 2006/0187378 A1 | 8/2006 | Bong et al. |

FOREIGN PATENT DOCUMENTS

| | | |
|---|---|---|
| JP | 11-264967 | 9/1999 |
| JP | 2001-125130 | 5/2001 |
| JP | 2001-202028 | 7/2001 |
| JP | 2001-350421 | 12/2001 |
| JP | 3290379 | 6/2002 |
| JP | 2002-250930 | 9/2002 |
| JP | 2003-295163 | 10/2003 |

* cited by examiner

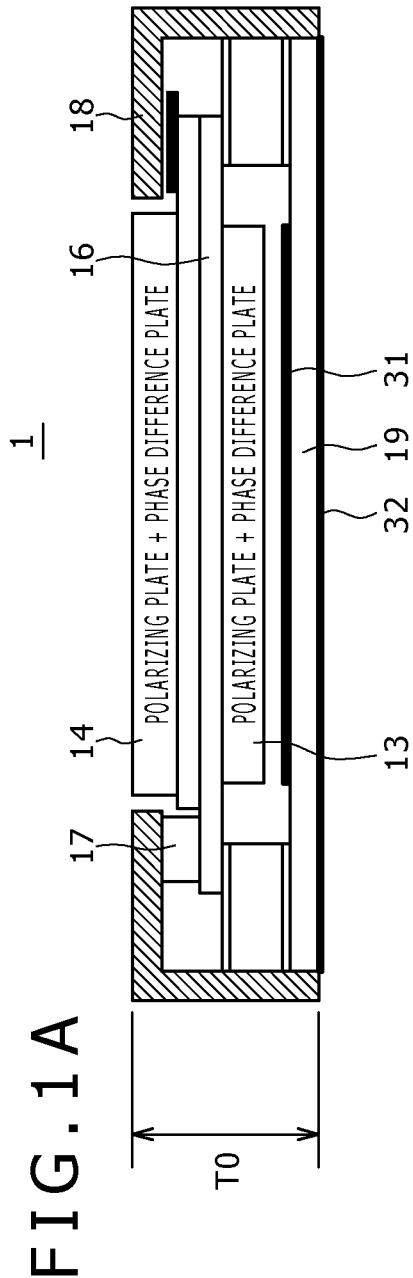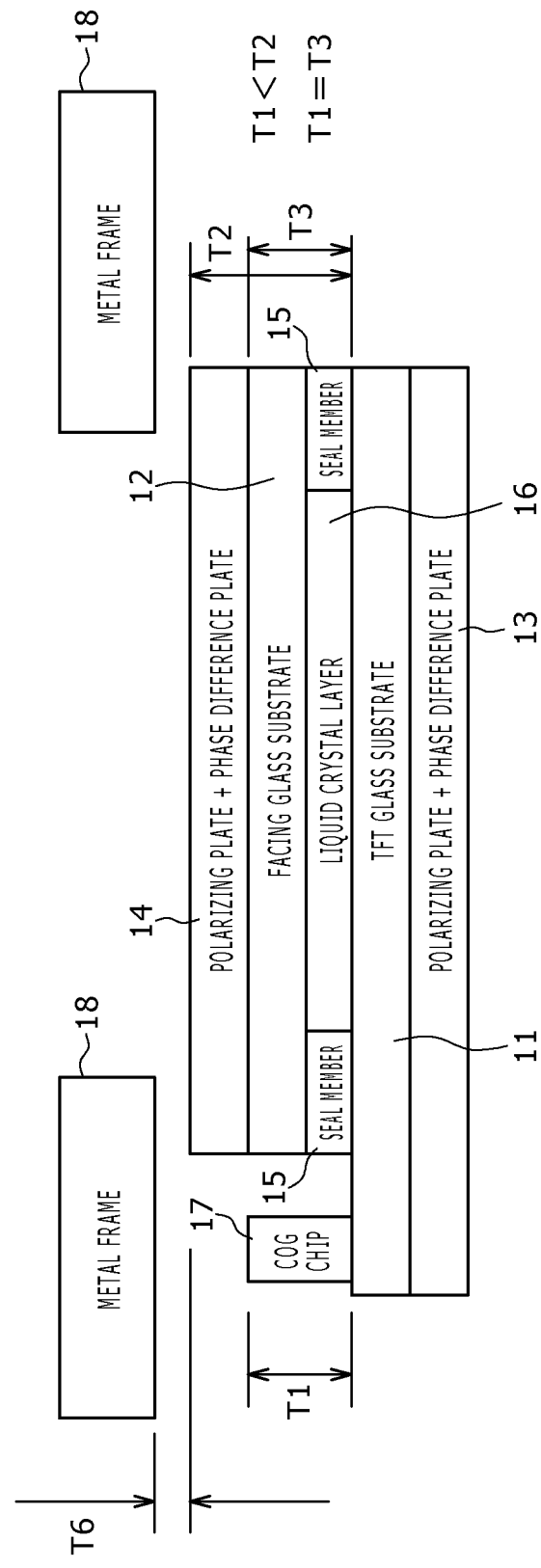
FIG. 1A
FIG. 1B

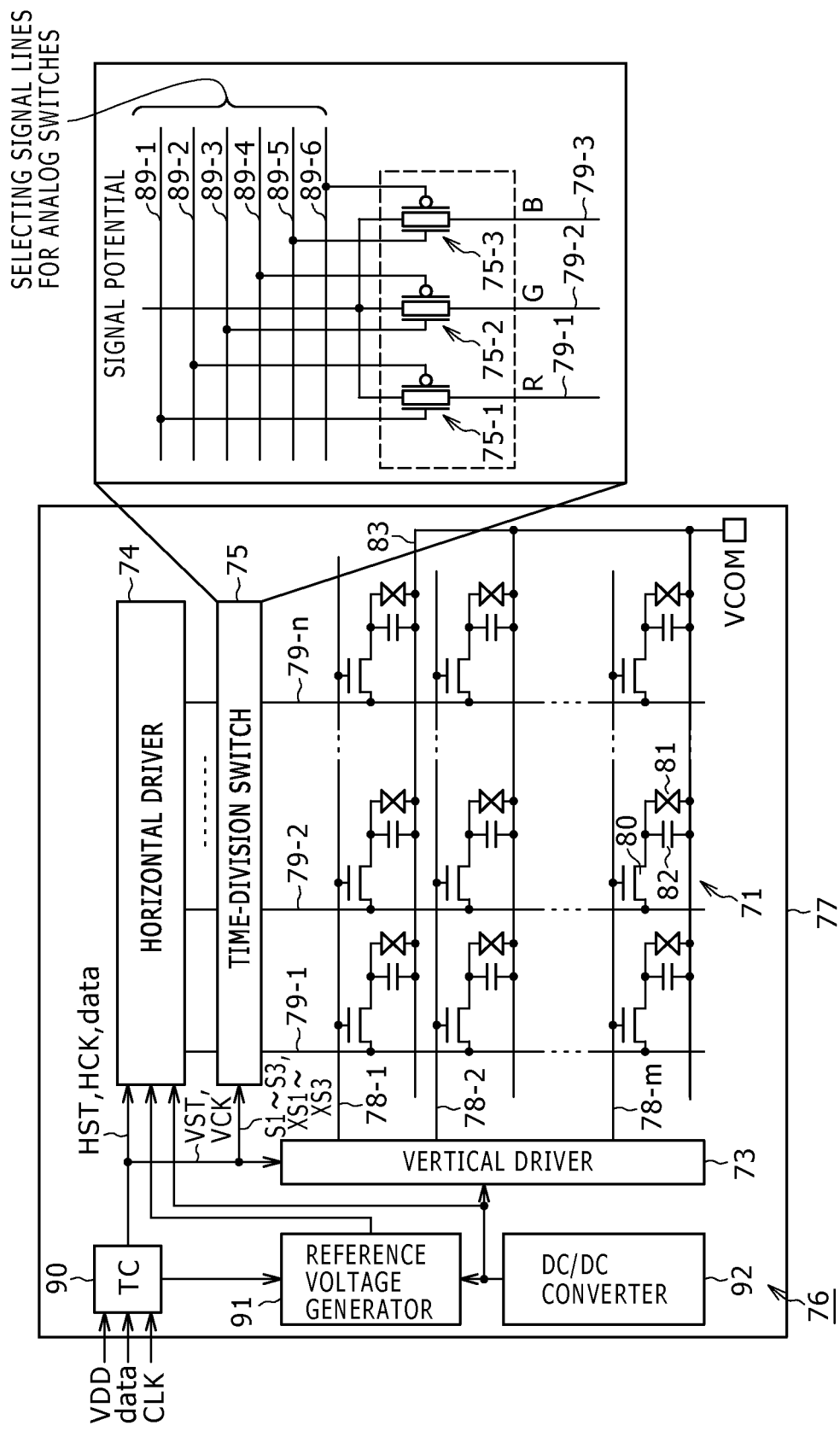

FIG.14

TABLE FOR COMPARING SPECIFICTIONS

|  | RELATED ART | PRESENT INVENTION |
|---|---|---|
| POLARIZING PLATE | 0.195 | 0.195 |
| FACING GLASS SUBSTRATE | 0.08 | 0.08 |
| COG CHIP | 0.39 | 0.08 |
| BUMP THICKNESS | 0.017 | 0.017 |
| TFT GLASS SUBSTRATE | 0.08 | 0.08 |
| POLARIZING PLATE | 0.195 | 0.195 |
| FRAME PLATE | 0.1 | 0.1 |
| OLED BACKLIGHT | 0.24 | 0.24 |
|  |  |  |
| TOTAL (INCLUDING COG CHIP) | 1.022 | 0.89 |
|  |  | UNIT (mm) |

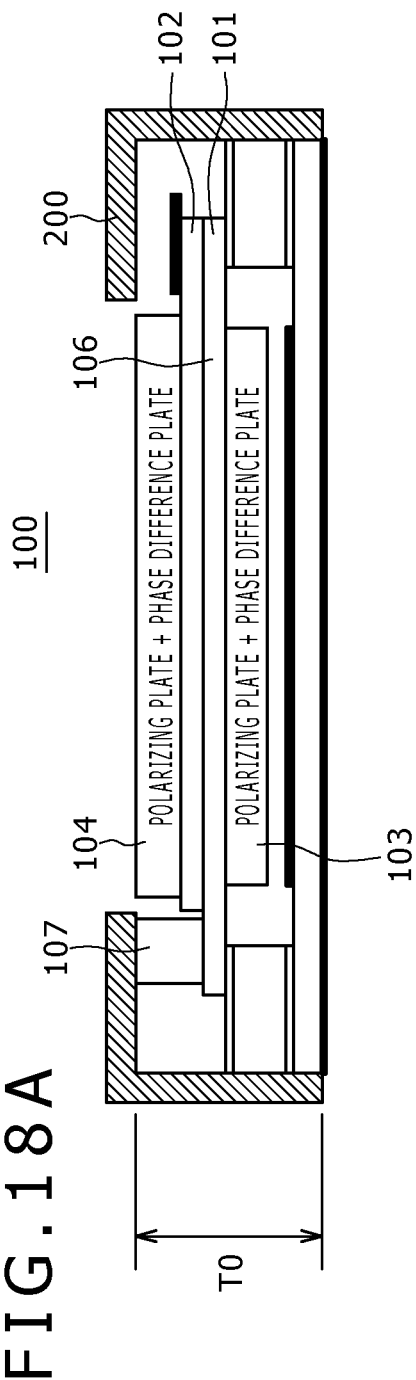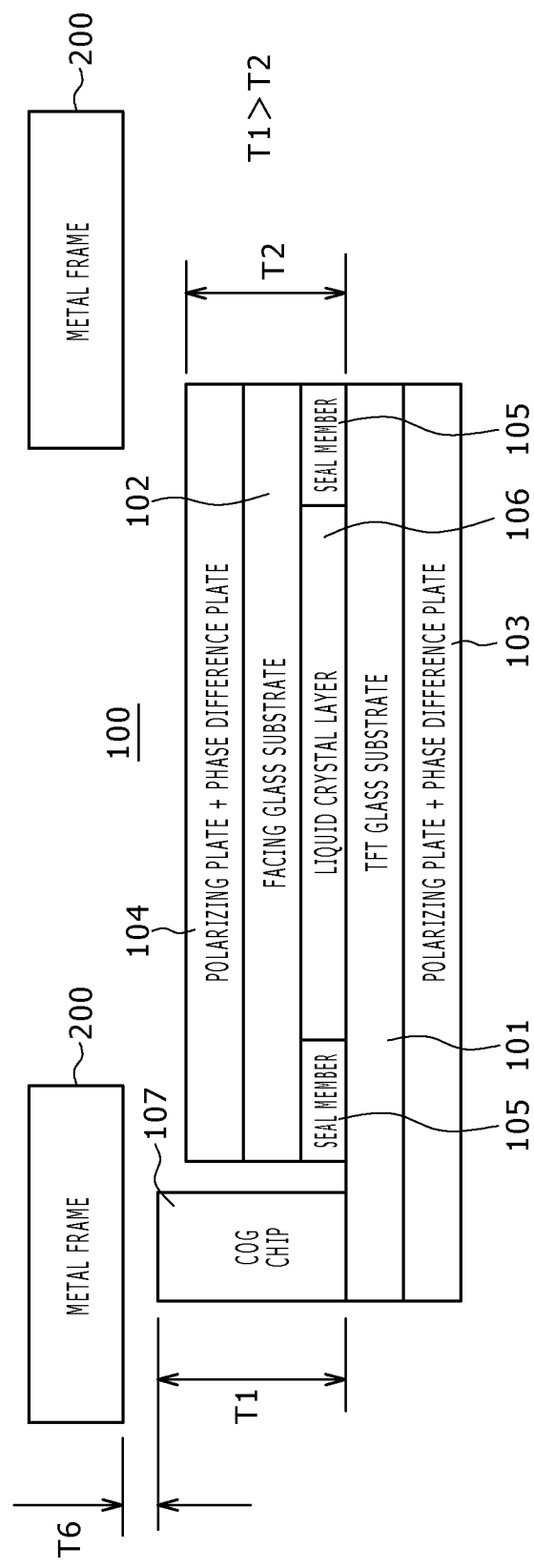
FIG. 18A
FIG. 18B

US 9,091,893 B2

METHOD OF MANUFACTURING A DISPLAY DEVICE COMPRISING A STEP OF SIMULTANEOUSLY POLISHING A SECOND SUBSTRATE AND A SEMICONDUCTOR CHIP TO HAVE THE SAME THICKNESS AS EACH OTHER

RELATED APPLICATION DATA

This application is a continuation of U.S. patent application Ser. No. 14/295,627 filed Jun. 4, 2014, which is a division of U.S. patent application Ser. No. 13/588,620 filed Aug. 17, 2012, now U.S. Pat. No. 8,804,089 issued Aug. 12, 2014, which is a division of U.S. patent application Ser. No. 11/684,867, filed on Mar. 12, 2007, now U.S. Pat. No. 8,274,633 issued Sep. 25, 2012 the entireties of which are incorporated herein by reference to the extent permitted by law. The present invention claims priority to and contains subject matter related to Japanese Patent Application No. JP 2006-069539 filed in the Japan Patent Office on Mar. 14, 2006, the entire contents of which are incorporated herein by reference.

BACKGROUND OF THE INVENTION

1. Field of the Invention

The present invention relates to a display device, a method of manufacturing such a display device, and an electronic apparatus for use in a portable terminal such as a cellular phone, a PDA (Personal Digital Assistant), or the like which is required to be of a low profile.

2. Description of the Related Art

One of the most important concerns for designing portable terminals is to make themselves low in profile. If a liquid crystal display device for use in a portable terminal display is thick, then it presents an obstacle to efforts to make the portable terminal low in profile. Therefore, there are growing demands for low-profile liquid crystal display devices.

FIGS. 18A and 18B of the accompanying drawings schematically show a cross-sectional structure of a general liquid crystal display device. FIG. 18A shows an overall cross-sectional structure of a liquid crystal panel 100, and FIG. 18B shows the cross-sectional structure in greater detail.

As shown in FIGS. 18A and 18B, the liquid crystal panel 100 includes a transparent insulating substrate (hereinafter referred to as "TFT (Thin Film Transistor) glass substrate") 101 supporting thereon pixel switches and a driver circuit therefor which are constructed of TFTs, a transparent insulating substrate (hereinafter referred to as "facing glass substrate") 102 disposed in facing relation to the TFT glass substrate 101, and a liquid crystal display (LCD) layer 106 held between the TFT glass substrate 101 and the facing glass substrate 102 and sealed by a seal member 105.

In an attempt to make the liquid crystal panel 100 low in profile, a semiconductor chip 107 including a control circuit for controlling the driver circuit is mounted as a COG (Chip On Glass) component on the TFT glass substrate 101. The semiconductor chip 107 will hereinafter be referred to as "COG chip 107".

The use of the COG chip 107 allows design efforts to be made to reduce the total thickness of the facing glass substrate 102, the TFT glass substrate 101, the seal member 105, and polarizing plate and phase difference plate combinations 103, 104 mounted respectively on the facing glass substrate 102 and the TFT glass substrate 101 and also to make the COG 107 thin.

The thickness T1 (e.g., 390 µm) of the COG chip 107 has been designed to be greater than the total thickness T2 (195 µm+80 µm=275 µm) of the polarizing plate and phase difference plate combination 104, the facing glass substrate 102, and the seal member 105 (T1>T2). In FIG. 18A, the liquid crystal panel 100 has an overall thickness T0.

Many proposals have been made to reduce the thickness of liquid crystal display devices.

For example, a liquid crystal display device has a liquid crystal display panel whose opposite surfaces are polished to make itself thin, so that a plurality of liquid crystal display panels can be stacked together for displaying images (see Japanese Patent No. 3290379, paragraphs [0007] through [0013], FIG. 1, referred to as Patent Document 1). After a liquid crystal display panel has been polished into a low profile, a COG chip is connected thereto (see Japanese Patent Laid-open No. Hei 11-104954, paragraphs [0007] through [0009], FIG. 3, referred to as Patent Document 2). The thickness of a COG chip is smaller than the total thickness of a facing glass substrate and a seal member which seals an LCD layer (see Japanese Patent Laid-open No. 2001-350421, paragraphs [0007] through [0008], FIG. 7, referred to as Patent Document 3). Polarizing plate and phase difference plate combinations are in the form of polymer films mounted on a facing glass substrate and a TFT glass substrate by an adhesive (see Japanese Patent Laid-open No. 2003-121641, paragraphs [0006] through [0007], referred to as Patent Document 4). In order to increase the mechanical strength of a glass substrate in a mounting area for a TCP (Tape Carrier Package), the thickness of the glass substrate in a display area is reduced, and the thickness of the glass substrate in the TCP mounting area is increased (see Japanese Patent Laid-open No. 2003-241171, paragraphs [0007] through [0009], FIG. 1, referred to as Patent Document 5).

According to Patent Document 1, however, since a TCP is used as an external terminal, no consideration for the mounting of a COG chip has been made. If a COG chip is mounted on a TFT glass substrate, then the height of the COG chip is greater than the thickness of a facing glass substrate, making it difficult to reduce the thickness of the liquid crystal panel.

According to Patent Document 2, the height of the COG chip may not be made equal to or smaller than the height of a facing glass substrate. The disclosed liquid crystal panel is not suitable for making a liquid crystal display device compact.

As shown in FIGS. 18A and 18B, the liquid crystal panel 100 is fitted with a metal frame 200 serving as a protector for protecting the liquid crystal panel 100 and as a light shield for preventing light from leaking around the liquid crystal panel 100.

The metal frame 200 is vertically spaced from the liquid crystal panel 100 by a space T6. The reasons for the space T6 are that if the metal frame 200 contacts the liquid crystal panel 100, then the TFT glass substrate 101 and the facing glass substrate 102 are deformed, producing cell gap nonuniformities or irregularities in display area, and if the metal frame 200 contacts the COG chip 107, then the COG chip 107 presses the TFT glass substrate 101, tending to increase the contact resistance of the pad for the COG chip 107 or peel off the pad for the COG chip 107.

If the TFT glass substrate 101 and the facing glass substrate 102 cannot ignore the thickness of the COG chip 107, then the thickness of the space T6 is determined by the thickness of the COG chip 107 which includes the driver circuit outside of the display area, rather than by being limited by the device (pixel switch) structure in the display area.

According to Patent Document 3, the liquid crystal panel is made low in profile by making the thickness of the COG chip smaller than the total thickness of the facing glass substrate and the seal member which seals the LCD layer.

Actually, however, the liquid crystal panel includes polarizing plate and phase difference plate combinations, and Patent Document 3 fails to show that the thickness of the COG chip is smaller than the total thickness including the thickness of the polarizing plate and phase difference plate combinations. Depending on the thickness of the polarizing plate and phase difference plate combinations, the metal frame which mechanically protects the peripheral edges of the liquid crystal panel may possibly contact the COG chip. To avoid possible contact between the metal frame and the COG chip, an extra space needs to be provided between the liquid crystal panel and the metal frame.

According to Patent Document 4, polarizing plate and phase difference plate combinations are simultaneously formed of polyester films to produce a low-profile liquid crystal panel. However, the thickness of the films may not be reduced to a minimum because the adhesive and the films need to have a certain level of mechanical strength. Therefore, the proposal according to Patent Document 4 is not effective to manufacture desired low-profile liquid crystal panels.

According to Patent Document 5, the polishing process is complex and involves an increased number of steps. In addition, the area surrounding the pad area needs to be thicker than the TFT glass substrate and the facing glass substrate.

As a result, though the structure proposed in Patent Document 5 is applicable to large-size liquid crystal displays as large as at least 6 inches, it may not be incorporated in smaller liquid crystal display modules because small-size, high-definition liquid crystal display devices as large as at most 6 inches require a polished area other than the pad area.

SUMMARY OF THE INVENTION

According to the embodiments of the present invention, it is desirable to provide a display device which employs a display panel that is lower in profile and has a thickness determined by a device structure in a display area thereof, a method of manufacturing such a display device, and an electronic apparatus.

According to an embodiment of the present invention, there is provided a display device including a first substrate with a pixel switch and drivers mounted thereon, a second substrate disposed in facing relation to the first substrate, a material layer held between the first substrate and the second substrate and having peripheral edges sealed by a seal member, the material layer having an electrooptical effect, and a semiconductor chip mounted as a COG component on the first substrate, the semiconductor chip having a control system for controlling the drivers, the semiconductor chip having a thickness equal to the total thickness of the seal member and the second substrate or larger than the thickness of the seal member and smaller than the total thickness.

According to another embodiment of the present invention, there is provided a display device including a first substrate with a pixel switch and drivers mounted thereon, a second substrate disposed in facing relation to the first substrate, a material layer held between the first substrate and the second substrate and having peripheral edges sealed by a seal member, the material layer having an electrooptical effect, a semiconductor chip mounted as a COG component on the first substrate, the semiconductor chip having a control system for controlling the drivers, and a protective fixing member disposed on at least a portion of the first substrate laterally of the semiconductor chip, the semiconductor chip having a thickness equal to or smaller than the distance from a surface of the first substrate which faces the material layer to a surface of the second substrate which faces away from the material layer.

According to yet another embodiment of the present invention, there is provided a display device including a first substrate with a pixel switch and drivers mounted thereon, a second substrate disposed in facing relation to the first substrate, a material layer held between the first substrate and the second substrate and having peripheral edges sealed by a seal member, the material layer having an electrooptical effect, a polarizing plate and phase difference plate combination disposed on the second substrate remotely from the material layer, and a semiconductor chip mounted as a COG component on the first substrate, the semiconductor chip having a control system for controlling the drivers, the semiconductor chip having a thickness smaller than the total thickness of the seal member, the second substrate, and the polarizing plate and phase difference plate combination.

Preferably, the display device further includes a protective fixing member disposed on at least a portion of the first substrate laterally of the semiconductor chip.

According to another embodiment of the present invention, there is provided a display device including a first substrate with a pixel switch and drivers mounted thereon, a second substrate disposed in facing relation to the first substrate, a material layer having an electrooptical effect, a first polarizing plate and phase difference plate combination disposed between the first substrate and the material layer, a second polarizing plate and phase difference plate combination disposed between the second substrate and the material layer, a seal member holding the material layer between the first and second polarizing plate and phase difference plate combinations thereby to seal the material layer, and a semiconductor chip mounted as a COG component on the first substrate, the semiconductor chip having a control system for controlling the drivers, the semiconductor chip having a thickness equal to or smaller than the total thickness of the first and second polarizing plate and phase difference plate combinations, the material layer, and the second substrate.

Preferably, the seal member is disposed between the first and second polarizing plate and phase difference plate combinations.

Preferably, the first and second polarizing plate and phase difference plate combinations are disposed inwardly of a region in which the material layer is sealed by the seal member, the seal member being disposed between the first substrate and the second substrate alongside of the first and second polarizing plate and phase difference plate combinations.

According to further embodiment of the present invention, there is provided a method of manufacturing a display device having a first substrate with a pixel switch and drivers mounted thereon, a second substrate disposed in facing relation to the first substrate, and a material layer held between the first substrate and the second substrate and sealed by a seal member, including the steps of mounting a semiconductor chip having a control system for controlling the drivers, as a COG component on the first substrate parallel to a region in which the seal member and the second substrate are stacked, filling a space around the semiconductor chip with a protective fixing member thereby to secure the first substrate and the semiconductor chip to each other, and simultaneously polishing the second substrate and the semiconductor chip to the same thickness as each other.

According to yet further embodiment of the present invention, there is provided an electronic apparatus having a display device, the display device including a first substrate with a pixel switch and drivers mounted thereon, a second substrate disposed in facing relation to the first substrate, a material layer held between the first substrate and the second substrate and having peripheral edges sealed by a seal member, the material layer having an electrooptical effect, and a semiconductor chip mounted as a COG component on the first substrate, the semiconductor chip having a control system for controlling the drivers, the semiconductor chip having a thickness equal to the total thickness of the seal member and the second substrate or larger than the thickness of the seal member and smaller than the total thickness.

According to another embodiment of the present invention, there is provided an electronic apparatus having a display device, the display device including a first substrate with a pixel switch and drivers mounted thereon, a second substrate disposed in facing relation to the first substrate, a material layer held between the first substrate and the second substrate and having peripheral edges sealed by a seal member, the material layer having an electrooptical effect, a polarizing plate and phase difference plate combination disposed on the second substrate remotely from the material layer, and a semiconductor chip mounted as a COG component on the first substrate, the semiconductor chip having a control system for controlling the drivers, the semiconductor chip having a thickness smaller than the total thickness of the seal member, the second substrate, and the polarizing plate and phase difference plate combination.

According to yet another embodiment of the present invention, there is provided an electronic apparatus having a display device, the display device including a first substrate with a pixel switch and drivers mounted thereon, a second substrate disposed in facing relation to the first substrate, a material layer having an electrooptical effect, a first polarizing plate and phase difference plate combination disposed between the first substrate and the material layer, a second polarizing plate and phase difference plate combination disposed between the second substrate and the material layer, a seal member holding the material layer between the first and second polarizing plate and phase difference plate combinations thereby to seal the material layer, and a semiconductor chip mounted as a COG component on the first substrate, the semiconductor chip having a control system for controlling the drivers, the semiconductor chip having a thickness equal to or smaller than the total thickness of the first and second polarizing plate and phase difference plate combinations, the material layer, and the second substrate.

The above and other features and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 1A and 1B are cross-sectional views of a liquid crystal display device according to a first embodiment of the present invention;

FIG. 12 is a circuit diagram, partly in block form, of a driver circuit for use in the liquid crystal display devices according to the first and second embodiments;

FIG. 14 is a table showing specifications achieved by a low-profile liquid crystal display device according to the embodiments of the present invention;

FIGS. 18A and 18B are cross-sectional views of a general liquid crystal display device.

DETAILED DESCRIPTION OF THE PREFERRED EMBODIMENTS

First Embodiment

Figure 2:
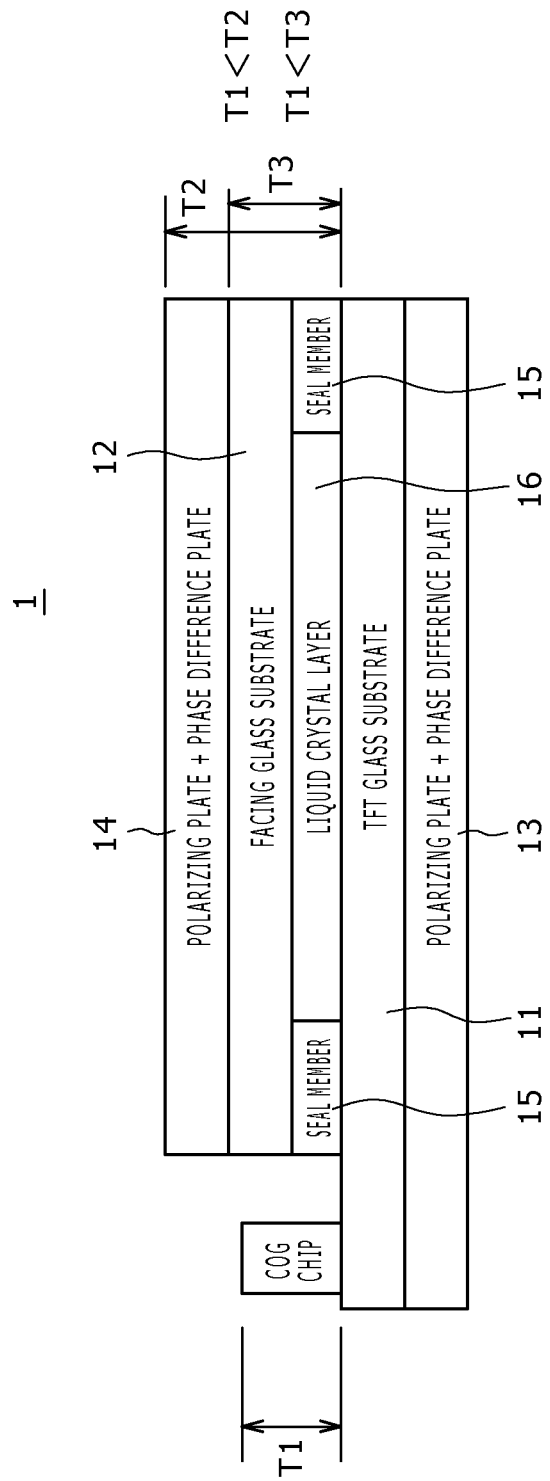
FIG. 2 is a cross-sectional view showing a first application of the liquid crystal display device according to the first embodiment.

FIGS. 1A and 1B show in cross section a liquid crystal display device according to a first embodiment of the present invention. Specifically, FIG. 1A shows an overall cross-sectional structure of a liquid crystal panel of the liquid crystal display device according to the first embodiment, and FIG. 1B shows the cross-sectional structure in greater detail. According to the first embodiment, the liquid crystal panel has a liquid crystal layer as a material layer having an electrooptical effect.

As shown in FIGS. 1A and 1B, the liquid crystal display device, generally denoted by 1, includes a TFT (Thin Film Transistor) glass substrate 11 as a first transparent insulating substrate supporting thereon pixel switches and a driver circuit therefor which are constructed of TFTs, a facing glass substrate 12 as a second transparent insulating substrate disposed in facing relation to the TFT glass substrate 11, polarizing plate and phase difference plate combinations 13, 14 mounted respectively on the TFT glass substrate 11 and the facing glass substrate 12, a liquid crystal layer (material layer) 16 held between the TFT glass substrate 11 and the facing glass substrate 12 and having peripheral edges sealed by a seal member 15, and a semiconductor chip (COG chip) 17 including a control circuit for controlling the driver circuit and mounted as a COG component on the TFT glass substrate 11.

The COG chip 17 has a thickness T1 smaller than the total thickness T2 of the facing glass substrate 12, the polarizing plate and phase difference plate combination 14 mounted on the facing glass substrate 12, and the seal member 15 (T1<T2). Because T1<T2, a metal frame 18 of the liquid crystal display device 1 is prevented from contacting the liquid crystal panel.

The COG chip 17 and the facing glass substrate 12 are simultaneously polished by a polishing material of alumina to equalize the thickness T1 of the COG chip 17 and the total thickness T3 of the facing glass substrate 12 and the seal member 15 (T1=T3). Specifically, each of the thickness T1 and the thickness T3 may be set to 80 μm, for example. Details of the process of polishing the COG chip 17 and the facing glass substrate 12 will be described later with reference to FIG. 11A.

As shown in FIG. 1A, the liquid crystal display device 1 also includes the metal frame 18 attached to liquid crystal panel referred to above and an OLED (Organic Light-Emitting Diode) backlight 19. Backlight emitted by the OLED backlight 19 is diffused by a diffusion sheet 31 and illuminates the liquid crystal panel from its rear side to allow the liquid crystal panel to display clear images through a color filter substrate, not shown. The outer surface of the OLED backlight 19 is covered with a protective film 32.

Figure 3:
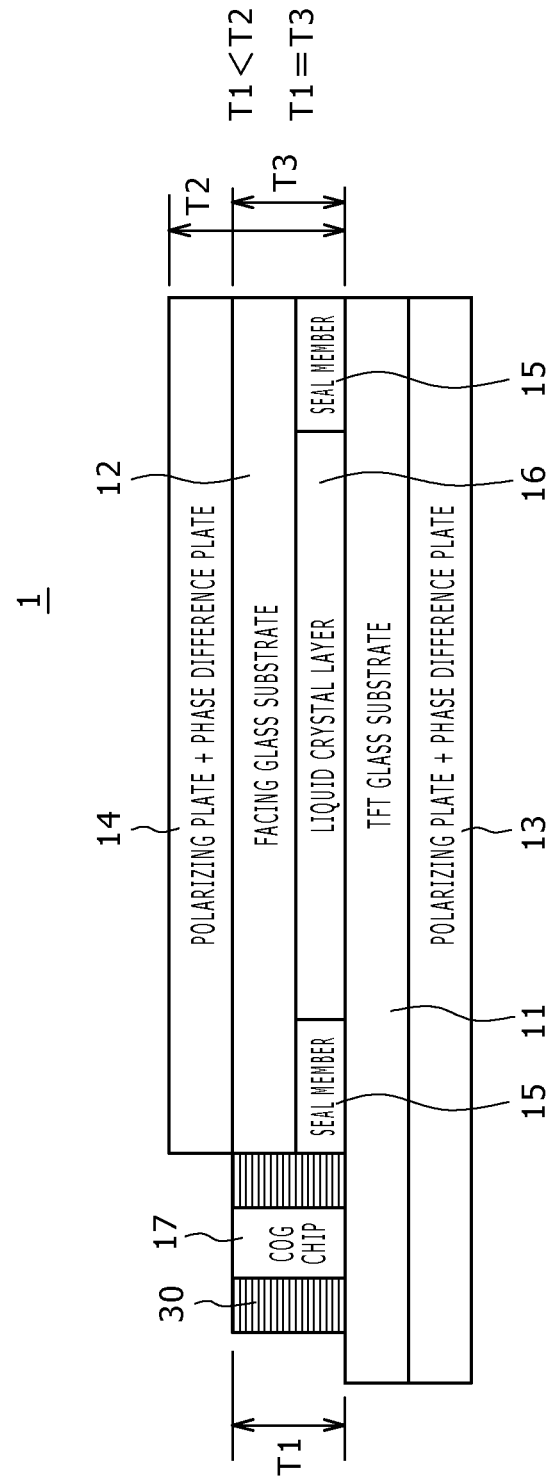
FIG. 3 is a cross-sectional view showing a second application of the liquid crystal display device according to the first embodiment.
Figure 4:
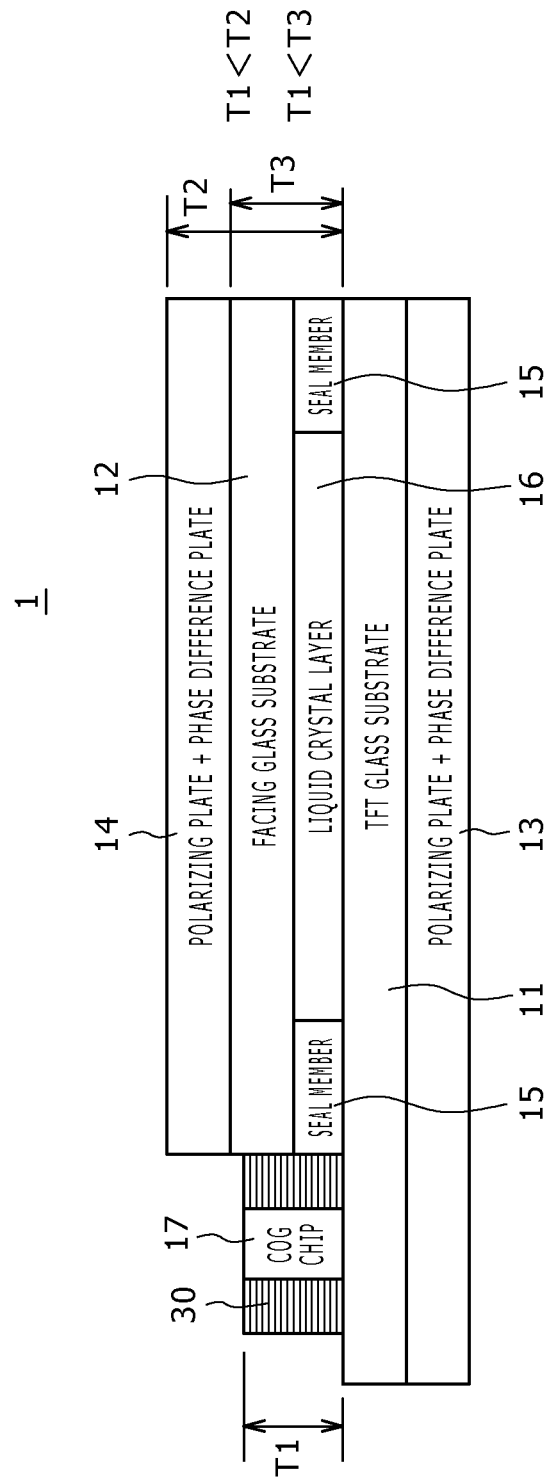
FIG. 4 is a cross-sectional view showing a third application of the liquid crystal display device according to the first embodiment.

FIGS. 2 through 4 show first through third applications, respectively, of the liquid crystal display device 1 according to the first embodiment.

Those of the components shown in FIGS. 2 through 4 which are identical to those shown in FIG. 1 are denoted by identical reference characters.

According to the first application shown in FIG. 2, the COG chip 17 has a thickness smaller than the total thickness of the facing glass substrate 12 and the seal member 15.

Specifically, since the COG chip 17 can independently be mounted after the facing glass substrate 12, the seal member 15, and the TFT glass substrate 11 are formed, the liquid crystal panel can be fabricated such that the thickness T1 of the COG chip 17 and the total thickness T3 of the facing glass substrate 12 and the seal member 15 are related to each other as T1<T3.

For example, the thickness T1 may be set to 60 μm and the thickness T3 to 80 μm. The TFT glass substrate 11 and the facing glass substrate 12 may be polished to the thickness of 80 μm.

According to the third application shown in FIG. 3, a protective fixing member 30 is disposed between the COG chip 17 and the combination of the facing glass substrate 12 and the seal member 15. Specifically, the protective fixing member 30 is disposed around the COG chip 17.

The thickness T1 of the COG chip 17 and the total thickness T3 of the facing glass substrate 12 and the seal member 15 are equal to each other (T1=T3).

The protective fixing member 30 is made of a silicon resin, a polyimide resin, or an ultraviolet-curable resin. The protective fixing member 30 serves to prevent the pad of the COG chip 17 from being displaced horizontally and vertically. The thickness T1 and the thickness T3 may be set to 60 μm.

According to the third application shown in FIG. 4 which also includes the protective fixing member 30, the thickness T1 of the COG chip 17 is smaller than the total thickness T2 of the facing glass substrate 12, the polarizing plate and phase difference plate combination 14 provided on the facing glass substrate 12, and the seal member 15 (T1<T2), and is also smaller than the total thickness T3 of the facing glass substrate 12 and the seal member 15 (T1<T3).

The polarizing plate and phase difference plate combination 13 may be disposed between the TFT glass substrate 11 and the liquid crystal layer 16, and the polarizing plate and phase difference plate combination 14 may be disposed between the liquid crystal layer 16 and the facing glass substrate 12.

According to the first embodiment, the thickness of the COG chip 17 mounted on the TFT glass substrate 11 is smaller than the total thickness of the facing glass substrate 12, the polarizing plate and phase difference plate combination 14, and the seal member 15, thereby making the liquid crystal panel low in profile. The thickness of the liquid crystal panel is finally determined by the device structure in the display area thereof.

Since the COG chip 17 and the liquid crystal panel are reduced in thickness by the same polishing process, the fabrication process is simplified. The percentage of defective display devices is low because a plurality of processes are not required for reducing the thickness of the COG chip 17 and the liquid crystal panel.

The polarizing plate and phase difference plate combinations 13, 14 may be disposed within the glass substrates 11, 12. With such a structure, since the polarizing plate and phase difference plate combinations 13, 14 are not required to be applied as films, the overall fabrication process is shortened.

As the protective fixing member 30 is disposed around the COG chip 17, moisture and mobile ions are prevented from entering the COG chip 17, the TFT glass substrate 11, and the facing glass substrate 12. As a result, images displayed on the liquid crystal panel are free of display irregularities and metal interconnects in the liquid crystal panel are prevented from being corroded, so that the display device is made highly reliable for a long period of time.

Second Embodiment

Figure 5:
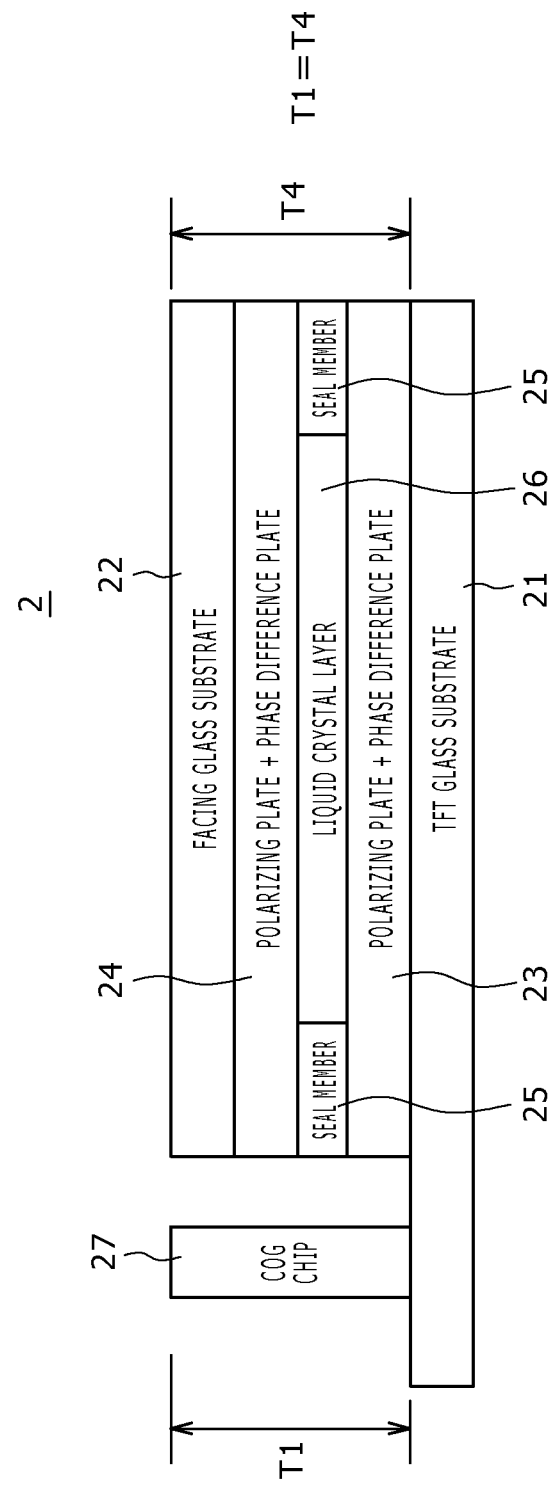
FIG. 5 is a cross-sectional view of a liquid crystal display device according to a second embodiment of the present invention.

FIG. 5 shows in cross section a liquid crystal display device according to a second embodiment of the present invention.

As shown in FIG. 5, the liquid crystal display device, generally denoted by 2, includes: a TFT glass substrate 21 as a first transparent insulating substrate supporting thereon pixel switches and a driver circuit therefor which are constructed of TFTs; a facing glass substrate 22 as a second transparent insulating substrate disposed in facing relation to the TFT glass substrate 21; a liquid crystal layer 26 positioned between the TFT glass substrate 21 and the facing glass substrate 22 and having peripheral edges sealed by a seal member 25; polarizing plate and phase difference plate combinations 23, 24 disposed between the TFT glass substrate 21 and the liquid crystal layer 26 and between the liquid crystal layer 26 and the facing glass substrate 22; the liquid crystal layer 26 being held between the polarizing plate and phase difference plate combinations 23, 24, and a COG chip 27 including a control circuit for controlling the driver circuit and mounted as a COG component on the TFT glass substrate 21.

The polarizing plate and phase difference plate combinations 23, 24 are formed as spin films or evaporated films in a process of forming TFT devices in the facing glass substrate 22 or the TFT glass substrate 21. After the above process is finished, the TFT glass substrate 21 and the facing glass substrate 22 are joined to each other with the seal member 25 interposed therebetween, and the liquid crystal layer 26 is sealed. Therefore, the polarizing plate and phase difference plate combinations 23, 24 can be formed in the lower and upper glass substrates 21, 22. The liquid crystal display device 2 can thus be made lower in profile.

In the liquid crystal panel, the polarizing plate and phase difference plate combinations 23, 24 are formed in the TFT glass substrate 21 and the facing glass substrate 22, and the liquid crystal layer 26 is sealed between the polarizing plate and phase difference plate combinations 23, 24. Since the COG chip 27, the facing glass substrate 22, the polarizing plate and phase difference plate combination 23, the seal member 25, and the polarizing plate and phase difference plate combination 24 are polished simultaneously. Therefore, the thickness T1 of the COG chip 27 is equal to the total thickness T4 of the facing glass substrate 22, the polarizing plate and phase difference plate combination 23, the seal member 25, and the polarizing plate and phase difference plate combination 24 (T1=T4).

FIGS. 6 through 10 show first through fifth applications, respectively, of the liquid crystal display device 2 according to the second embodiment.

Figure 6:
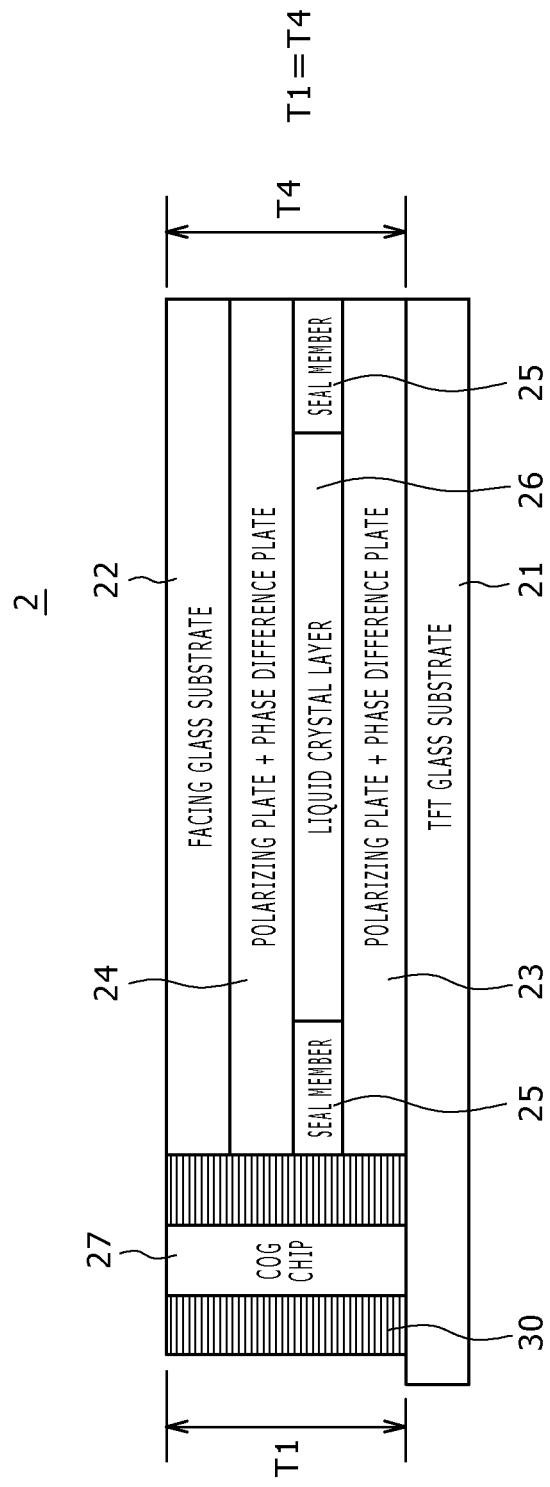
FIG. 6 is a cross-sectional view showing a first application of the liquid crystal display device according to the second embodiment.

According to the first application shown in FIG. 6, the protective fixing member 30 is disposed between the COG chip 27 and the combination of the facing glass substrate 22, the polarizing plate and phase difference plate combination 24, the seal member 25, and the polarizing plate and phase difference plate combination 23, so that thickness T1 is equal to the thickness T4 (T1=T4). Specifically, the protective fixing member 30 is disposed around the COG chip 27. The protective fixing member 30 is made of the material described above and functions in the manner described above.

Figure 7:
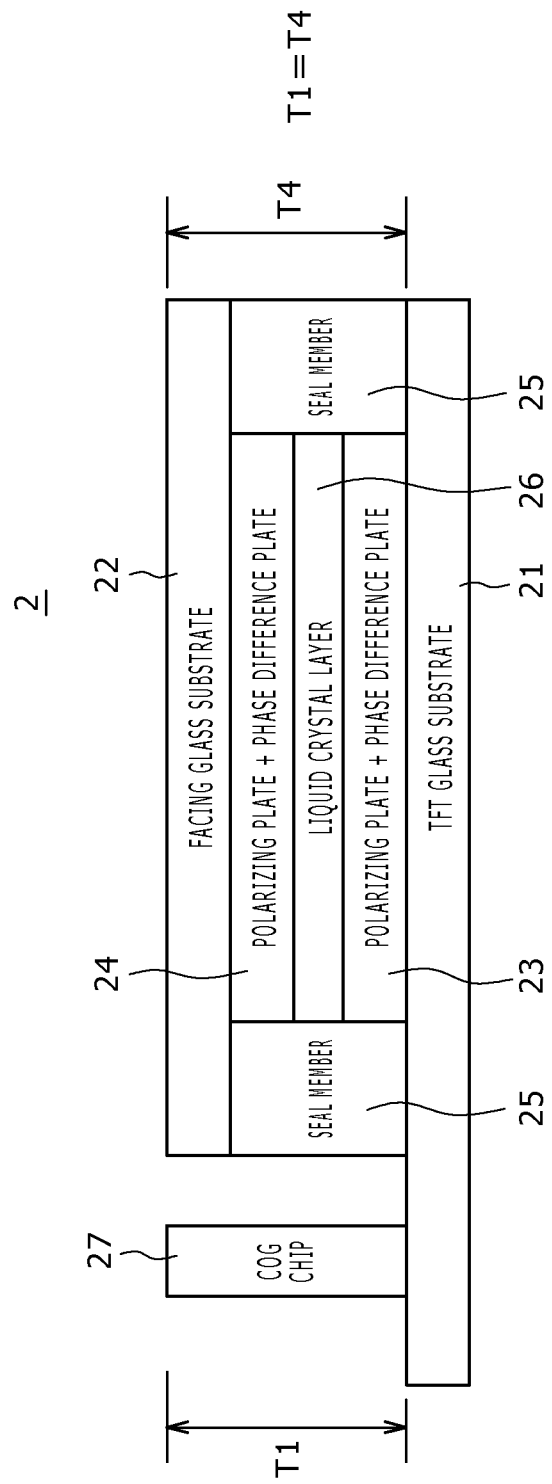
FIG. 7 is a cross-sectional view showing a second application of the liquid crystal display device according to the second embodiment.
Figure 8:
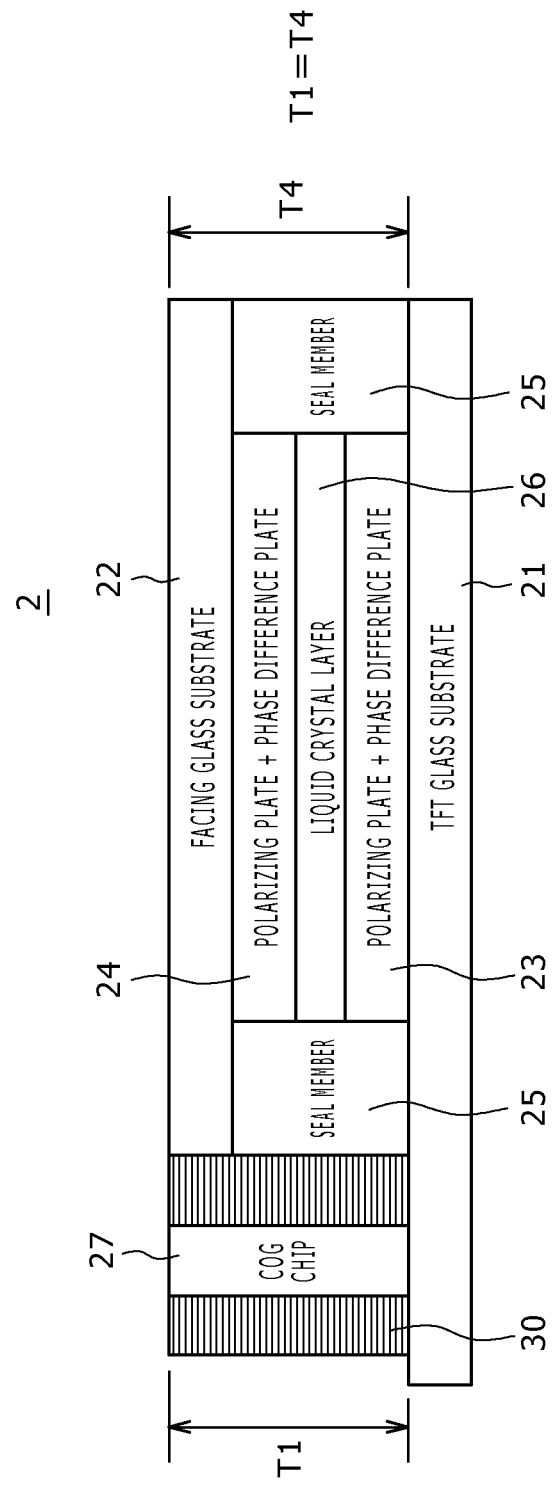
FIG. 8 is a cross-sectional view showing a third application of the liquid crystal display device according to the second embodiment.

According to the second and third applications shown in FIGS. 7 and 8, the polarizing plate and phase difference plate combinations 23, 24 are disposed inwardly of the seal member 25. With this arrangement, the thickness T1 of the COG chip 27 is equal to the total thickness T4 of the facing glass substrate 22 and the seal member 25 (T1=T4). Each of the thickness T1 and the thickness T4 is set to 80 μm, for example.

In the third application shown in FIG. 8, the protective fixing member 30 is disposed between the COG chip 27 and the combination of the facing glass substrate 22 and the seal member 25, and disposed around the COG chip 27.

In FIGS. 7 and 8, the polarizing plate and phase difference plate combinations 23, 24 are disposed inwardly of the seal member 25 by which the liquid crystal layer 26 is sealed. The seal member 25 extends between the TFT glass substrate 21 and the facing glass substrate 22 and is disposed laterally of the polarizing plate and phase difference plate combinations 23, 24 and the liquid crystal layer 26. With this structure, the bonding strength of the entire assembly is high.

Figure 9:
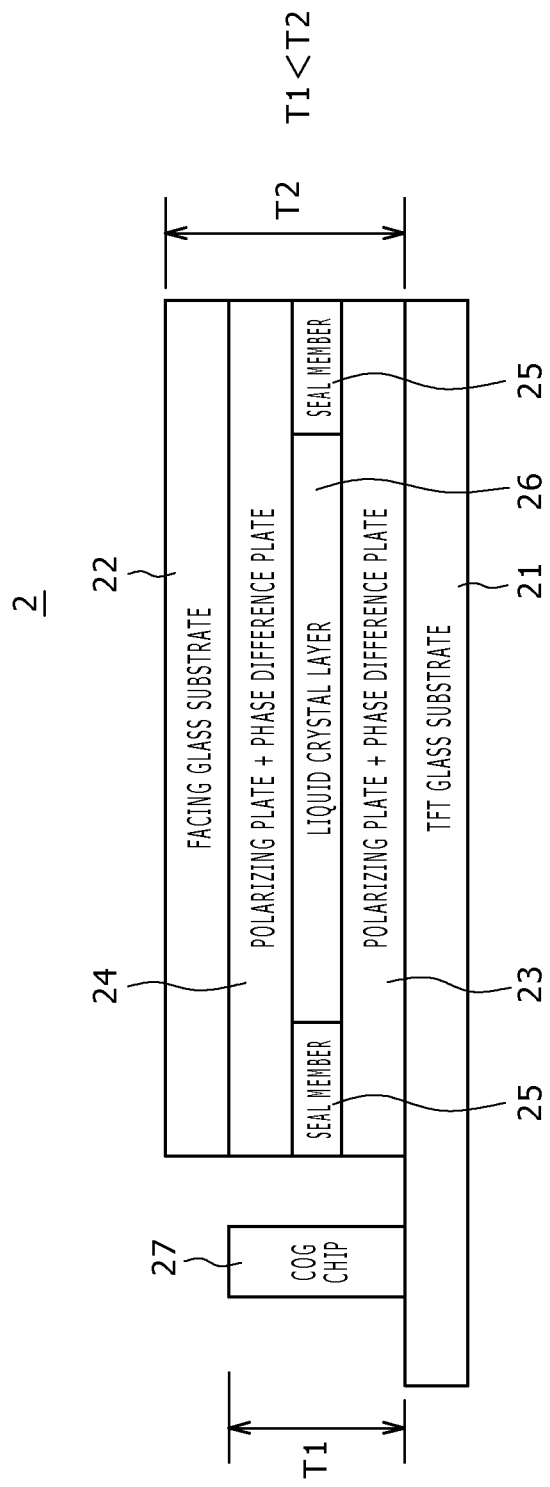
FIG. 9 is a cross-sectional view showing a fourth application of the liquid crystal display device according to the second embodiment.
Figure 10:
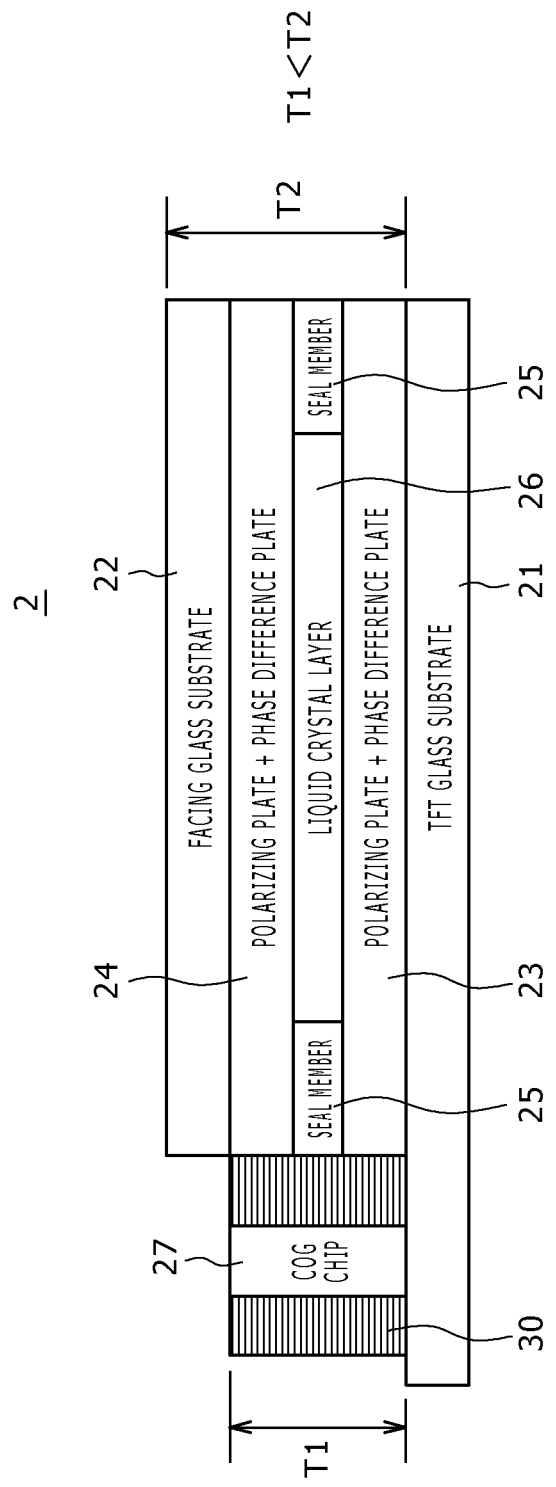
FIG. 10 is a cross-sectional view showing a fifth application of the liquid crystal display device according to the second embodiment.

According to the fourth and fifth applications shown in FIGS. 9 and 10, the thickness of the COG chip 27 and the total thickness of the facing glass substrate 22, the polarizing plate and phase difference plate combinations 23, 24, and the seal member 25 are reduced independently of each other.

Therefore, the COG chip 27 whose thickness has been reduced can be mounted on the liquid crystal panel whose thickness has been reduced. The thickness T1 of the COG chip 27 is smaller than the total thickness T2 of the facing glass substrate 22, the polarizing plate and phase difference plate combination 24, and the seal member 25 (T1<T2).

According to the second embodiment, as described above, the thickness of the COG chip 27 mounted on the TFT glass substrate 21 is smaller than the total thickness of the facing glass substrate 22, the polarizing plate and phase difference plate combination 24, and the seal member 25, making the liquid crystal panel lower in profile. The thickness of the liquid crystal panel is finally determined by the device structure in the display area thereof.

Since the COG chip 27 and the liquid crystal panel can be reduced in thickness by the same polishing process, the fabrication process is simplified. The percentage of defective display devices is low because a plurality of processes are not required for reducing the thickness of the COG chip 27 and the liquid crystal panel.

The polarizing plate and phase difference plate combinations 23, 24 are disposed within the glass substrates 21, 22. With such a structure, since the polarizing plate and phase difference plate combinations 23, 24 are not required to be applied as films, the overall fabrication process is shortened.

As the protective fixing member 30 is disposed around the COG chip 27, moisture and mobile ions are prevented from entering the COG chip 27, the TFT glass substrate 21, and the facing glass substrate 22. As a result, images displayed on the liquid crystal panel are free of display irregularities and metal interconnects in the liquid crystal panel are prevented from being corroded, so that the display device is made highly reliable for a long period of time.

A process of manufacturing a liquid crystal display device according to the second embodiment will be described below.

Figure 11A:
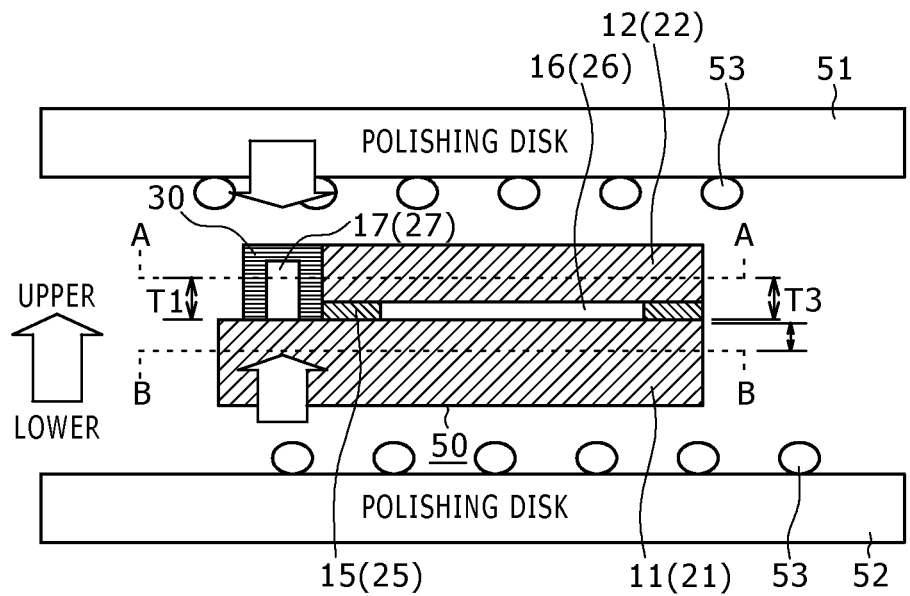
FIGS. 11A and 11B are cross-sectional views illustrative of a polishing process of a method of manufacturing the liquid crystal display device according to the embodiments.
Figure 11B:
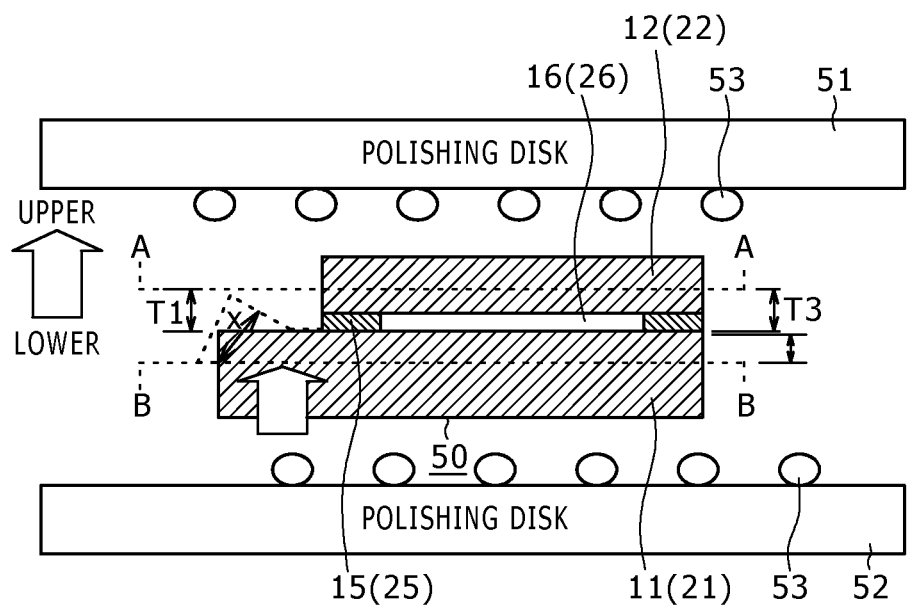

FIG. 11A is illustrative of a process of polishing a liquid crystal panel according to the present invention, and FIG. 11B is illustrative of a process of polishing a liquid crystal panel in related art.

In FIGS. 11A and 11B, a liquid crystal panel 50 is polished by polishing disks 51, 52 with abrasive particles 53 of alumina. The polishing disks 51, 52 apply a polishing pressure to the liquid crystal panel 50 as indicated by the thick arrows.

In the polishing process, the COG chip 17 (27), the protective fixing member 30, the TFT glass substrate 11 (21), and the facing glass substrate 12 (22) are polished to regions indicated by the dot-and-dash lines AA, BB until the thickness T1 of the COG chip 17 (27) and the combined thickness T3 of the facing glass substrate 12 (22) and the seal member 15 (25) are equal to each other (T1=T3 (0.08 mm)).

In FIG. 11A, after the liquid crystal panel having a thickness of 0.7 mm and the COG chip 17 (27) having a thickness of 390 μm are mounted in place, the protective fixing member 30 is placed around the COG chip 17 (27) and between the COG chip 17 (27) and the facing glass substrate 12 (22), and the liquid crystal panel 50 and the COG chip 17 (27) are secured to each other. Thereafter, the COG chip 17 (27), the protective fixing member 30, the TFT glass substrate 11 (21), and the facing glass substrate 12 (22) start being polished with the abrasive particles 53 of alumina. The liquid crystal panel 50 and the COG chip 17 (27) are simultaneously polished until finally the thickness of the facing glass substrate 12 (22) of the liquid crystal panel 50 and the thickness of the COG chip 17 (27) are equal to each other.

Since the facing glass substrate 12 (22) is not provided on the COG chip 17 (27), the polishing pressure is prevented from being lowered. The thickness of the TFT glass substrate 11 (21) after it has been polished is 0.08 mm, for example.

According to the process of polishing the liquid crystal panel in related art shown in FIG. 11B, the COG chip 17 (27) is polished with no protective fixing member 30 being disposed therearound. Therefore, when the TFT glass substrate 11 (21) is thinned to a thickness smaller than 0.1 mm, the portion of the TFT glass substrate 11 (21) which serves as the pad for the COG chip 17 (27) is deformed and curved as indicated by the arrow X under the pressure from the polishing disk 51, resulting in a reduction in the polishing pressure. At this time, the COG chip 17 (27) has not yet been mounted in position. Therefore, the portion of the TFT glass substrate 11 (21) which serves as the pad for the COG chip 17 (27) increases in thickness. Stated otherwise, the TFT glass substrate 11 (21) suffers thickness irregularities.

As a result, since the TFT glass substrate 11 (21) tends to break if a polishing pressure is applied thereto, the pressure applied when the COG chip 17 (27) is to be mounted cannot be increased. Consequently, the contact resistance of the pad at the COG chip 17 (27) increases, failing to provide a normal connection between the COG chip 17 (27) and the liquid crystal panel 50.

According to the manufacturing process shown in FIG. 11A, inasmuch as a polishing pressure can be applied from both the polishing disks 51, 52 to the TFT glass substrate 11 (21) and the facing glass substrate 12 (22), it is possible to polish the TFT glass substrate 11 (21) and the facing glass substrate 12 (22) to uniform thicknesses.

Finally, the total thickness of the facing glass substrate 12 (22) and the seal member 15 (25) may be reduced to 0.08 mm, and the thickness of the COG chip 17 (27) may be reduced to 0.08 mm.

In the process of manufacturing the liquid crystal display device according to the present embodiment, as described above, the COG chip 17 (27) and the liquid crystal panel 50 can be thinned down in the same polishing process. Accordingly, the fabrication process can be simplified, and the percentage of defective display devices is low because a plurality of processes are not required for reducing the thickness of the COG chip 17(27) and the liquid crystal panel 50.

FIG. 12 shows a circuit arrangement of a driver circuit of TFTs for use in the liquid crystal display devices according to the first and second embodiments, and a time-division switch employed in the driver circuit. Specifically, FIG. 12 shows a time-division-energized active-matrix liquid crystal display device.

As shown in FIG. 12, the time-division-energized active-matrix liquid crystal display device includes: a pixel switch 72 of pixels 71 arranged in rows and columns; a vertical driver 73 for successively selecting rows of pixels 71 of a pixel switch 72; a horizontal driver 74 for writing pixel signals in the pixels 71 of each of the selected rows; a time-division switch 75 for energizing the pixels 71 in a time-division fashion; and a control system 76 for controlling the vertical driver 73, the horizontal driver 74, and the time-division switch 75. The pixel switch 72, the vertical driver 73, the horizontal driver 74, the time-division switch 75, and the control system 76 are mounted on a LCD panel 77.

The pixels 71 include respective TFTs 80 having respective gate electrodes connected to gate lines 78-1 through 78-m and respective source electrodes connected to signal lines 79-1 through 79-n, respective liquid crystal cells 81 having pixel electrodes connected respectively to the drain electrodes of the TFTs 80, and respective auxiliary capacitors 82 having electrodes connected respectively to the drain electrodes of the TFTs 80.

In each of the pixels 71, the liquid crystal cell 81 has a facing electrode connected to a common line 83, and the auxiliary capacitor 82 has the other electrode also connected to the common line 83. A DC voltage is applied as a common voltage VCOM to the common line 83.

A time-division energization process will be described below. The signal lines of the pixel switch 72 are divided into a plurality of blocks, each of which includes a plurality of adjacent signal lines. The horizontal driver 74 outputs from its output terminals respective signal voltages in a time sequence to the signal lines in each of the blocks. The time-division switch 75, which is connected to the signal lines in each of the blocks, samples in a time-division fashion the signal voltages output in a time sequence from the horizontal driver 74, and applies the sampled signal voltages to the signal lines.

To perform the time-division energization process, the horizontal driver 74 outputs signal voltages in a time sequence to the signal lines in each of the blocks.

The time-division switch 75 includes analog switches (transmission switches) for sampling in a time-division fashion the signal voltages output in a time sequence from the horizontal driver 74. The time-division switch 75 has analog switches associated respectively with output terminals of the horizontal driver 74. In the illustrated embodiment, the time-division switch 75 performs a three-time-division process based on R (red), G (green), and B (blue) signals.

Specifically, the time-division switch 75 has three CMOS analog switches 75-1, 75-2, 75-3 in the form of parallel P-channel MOS and N-channel MOS transistors. The analog switches 75-1, 75-2, 75-3 may be of a PMOS or NMOS configuration rather than the CMOS configuration.

In the time-division switch 75, the three analog switches 75-1, 75-2, 75-3 have respective input terminals connected in common and respective output terminals connected respectively to the input terminals of three signal lines 79-1, 79-2, 79-3. The input terminals of the analog switches 75-1, 75-2, 75-3 are supplied with a signal voltage output from the horizontal driver 74.

Six control lines 89-1 through 89-6 are connected to the analog switches 75-1, 75-2, 75-3 such that two control lines are connected to each analog switch. The analog switch 75-1 has two control input terminals (the gates of the CMOS transistors) connected to respective control lines 89-1, 89-2. The analog switch 75-2 has two control input terminals connected to respective control lines 89-3, 89-4. The analog switch 75-3 has two control input terminals connected to respective control lines 89-5, 89-6.

Gate selection signals S1 through S3, XS1 through XS3 for successively selecting the three analog switches 75-1, 75-2, 75-3 are given from a timing controller (TC) 90, to be described later, to the six control lines 89-1 through 89-6. The gate selection signals XS1 through XS3 are an inversion of the gate selection signals S1 through S3, respectively.

The gate selection signals S1 through S3, XS1 through XS3 successively turn on the three analog switches 75-1, 75-2, 75-3 in synchronism with the signal voltages output in a time sequence from the horizontal driver 74. The analog switches 75-1, 75-2, 75-3 sample the signal voltages output in a time sequence from the horizontal driver 74 in a three-time-division fashion during a 1H period, and supply the sampled signal voltages to the corresponding signal lines 79-1, 79-2, 79-3.

The control system 76 for controlling the vertical driver 73, the horizontal driver 74, and the time-division switch 75 has a timing controller (TC) 90, a reference voltage generator 91, and a DC/DC converter 92. The timing controller 90, the reference voltage generator 91, and the DC/DC converter 92 are mounted, together with the vertical driver 73, the horizontal driver 74, and the time-division switch 75, on the LCD panel 77.

Figure 13A:
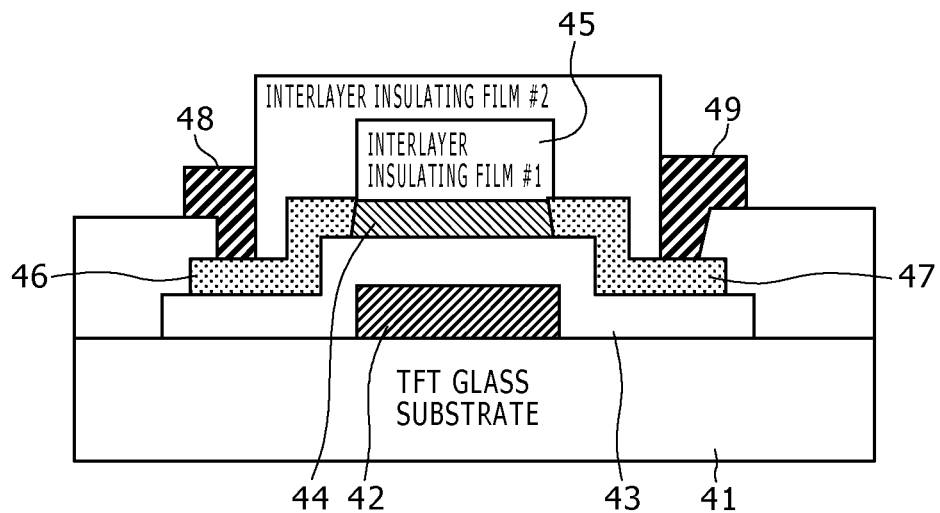
FIGS. 13A and 13B are cross-sectional views of thin film transistors for use in the liquid crystal display devices according to the first and second embodiments.
Figure 13B:
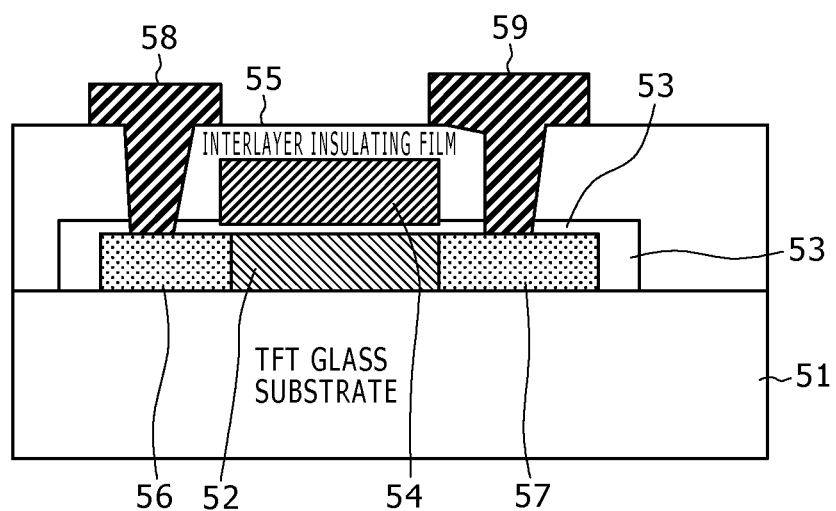

FIGS. 13A and 13B show cross-sectional structures of TFTs for use in the liquid crystal display devices according to the first and second embodiments.

A horizontal driver and a selector are constructed of polysilicon TFTs, and a COG chip is used as a driver IC for converting a high-rate digital signal into an analog signal and supplying it as an image signal to a liquid crystal panel.

As shown in FIGS. 13A and 13B, polysilicon TFTs used as pixel transistors making up a pixel switch and transistors making up a driver include bottom-gate polysilicon TFTs having a gate electrode disposed beneath an oxide film and top-gate polysilicon TFTs having a gate electrode disposed over an oxide film. The cross-sectional structures of these polysilicon TFTs are illustrated respectively in FIGS. 13A and 13B.

The bottom-gate polysilicon TFT shown in FIG. 13A includes: a TFT glass substrate 41; a gate electrode 42 disposed on the TFT glass substrate 41; a gate insulating film 43 disposed on the gate electrode 42; a polysilicon (Poly-Si) layer 44 disposed on the gate insulating film 43; and an interlayer insulating film 45 disposed on the polysilicon layer 44.

A source region 46 and a drain region 47, each including an N+ diffused layer, are disposed on the gate insulating layer 43 laterally of the gate electrode 42. The source region 46 and the drain region 47 are connected respectively to a source electrode 48 and a drain electrode 49.

The top-gate polysilicon TFT shown in FIG. 13B includes a glass substrate 51, a polysilicon layer 52 disposed on the glass substrate 51, a gate insulating film 53 disposed on the polysilicon layer 52, a gate electrode 54 disposed on the gate insulating film 53, and an interlayer insulating film 55 disposed on the gate electrode 54.

A source region 56 and a drain region 57, each including an N+ diffused layer, are disposed on the glass substrate 51 laterally of the polysilicon layer 52. The source region 56 and the drain region 57 are connected respectively to a source electrode 58 and a drain electrode 59.

According to the embodiments of the present invention, the thickness of a semiconductor chip (the COG chip 17, 27) mounted as a COG component on a first transparent insulating substrate (the TFT glass substrate 11, 21) is smaller than the total thickness of a second transparent insulating substrate (the facing glass substrate 12, 22), polarizing plate and phase difference plate combinations (13, 14, 23, 24), and a seal member (15, 25), thereby making the liquid crystal panel low in profile. The thickness of the liquid crystal panel is finally determined by the device structure in the display area thereof.

FIG. 14 shows specifications achieved by a low-profile liquid crystal panel for liquid crystal display device according to the present invention. In FIG. 14, the thicknesses of components of a liquid crystal panel in related art and an inventive liquid crystal panel are shown for comparison in a specification comparison table.

As shown in FIG. 14, if the COG chip 17 (27) becomes thinner, then since the thickness of the liquid crystal module depends on the thickness of the liquid crystal panel, the total thickness of the liquid crystal module including the metal frame 18 is reduced from 1.022 mm to 0.89 mm.

According to the embodiments of the present invention, as described above, the thickness of the COG chip 17 (27) mounted as a COG component on the TFT glass substrate 11 (21) is smaller than the total thickness of the facing glass substrate 12 (22), the polarizing plate and phase difference plate combinations 14 (24), and the seal member 15 (25), thereby making the liquid crystal panel low in profile. The thickness of the liquid crystal panel is finally determined by the device structure in the display area thereof.

Since the COG chip 17 (27) and the liquid crystal panel are reduced in thickness by the same polishing process, the fabrication process is simplified. The percentage of defective display devices is low because a plurality of processes are not required for reducing the thickness of the COG chip 17 (27) and the liquid crystal panel.

The polarizing plate and phase difference plate combinations 23, 24 may be disposed within the glass substrates 21, 22. With such a structure, since the polarizing plate and phase difference plate combinations 23, 24 are not required to be applied as films, the overall fabrication process is shortened.

As the protective fixing member 30 is disposed around the COG chip 17 (27), moisture and mobile ions are prevented from entering the COG chip 17 (27), the TFT glass substrate 11 (21), and the facing glass substrate 12 (22). As a result, images displayed on the liquid crystal panel are free of display irregularities and metal interconnects in the liquid crystal panel are prevented from being corroded, so that the display device is made highly reliable for a long period of time.

In order to reduce the weight of the liquid crystal display device as well as to reduce the thickness thereof, the TFT glass substrate 11 and the facing glass substrate 12 may be replaced with respective first and second transparent insulating substrates made of an organic material such as PET (Poly-Ethylene Terephthalate), PES (PolyEtherSulfone), acrylic resin, plastics, or the like.

In the above embodiments, the present invention has been described as being applied to liquid crystal display devices. However, the principles of the present invention are also applicable to other display devices including an EL display device including electroluminescence (EL) as electrooptical elements in respective pixels.

Figure 15:
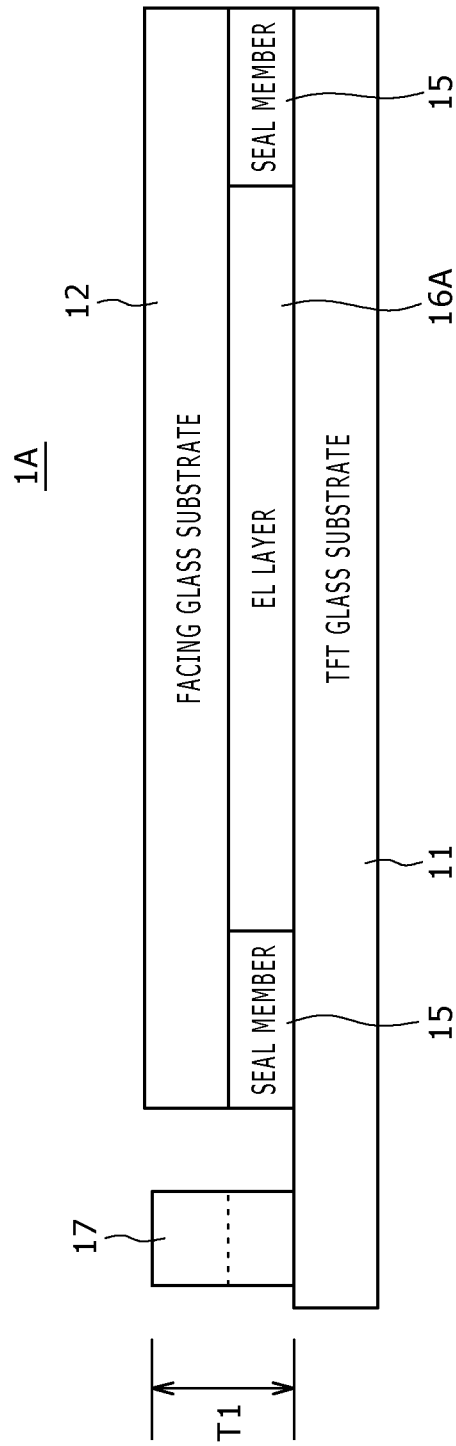
FIG. 15 is a cross-sectional view showing a basic structure of an EL display device which includes no protective fixing member.
Figure 16:
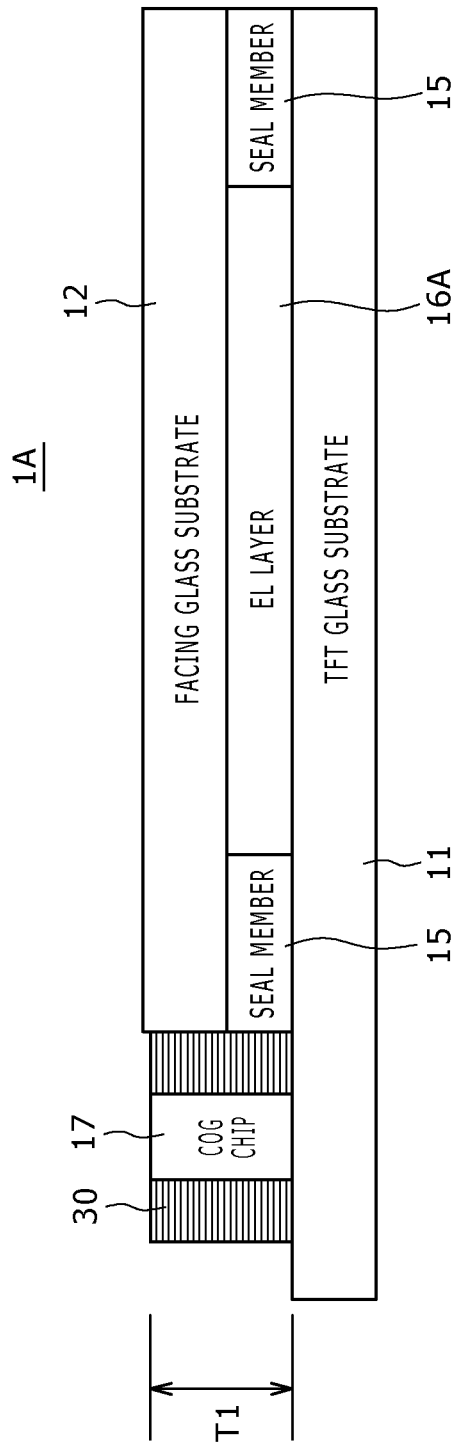
FIG. 16 is a cross-sectional view showing a basic structure of an EL display device which includes a protective fixing member.

FIGS. 15 and 16 show EL display devices 1A according to the present invention. As shown in FIGS. 15 and 16, the EL display devices 1A are free of polarizing plate and phase difference plate combinations, and have an EL layer 16A as a material layer instead of a liquid crystal layer.

Other details of the EL display devices shown in FIGS. 15 and 16 are similar to those of the liquid crystal display devices according to the above embodiments.

The EL display device 1A shown in FIG. 15 includes no protective fixing member, whereas the EL display device 1A shown in FIG. 16 includes a protective fixing member. In FIGS. 15 and 16, the thickness of the COG chip 17 is equal to or smaller than the total thickness of the facing glass substrate 12 and the seal member 15. If the thickness of the COG chip 17 is smaller than the total thickness of the facing glass substrate 12 and the seal member 15, then the thickness of the COG chip 17 is preferably greater than the thickness of the seal member 15.

The thickness of the COG chip 17 may be equal to or smaller than the distance from the surface of the TFT glass substrate 11 which faces the EL layer 16A to the surface of the facing glass substrate 12 which faces away from the EL layer 16A.

The display device according to the present invention can be used as a display device for use with OA apparatuses including personal computers, word processors, etc. and home appliances including TV receivers, etc. Particularly, the display device according to the present invention is preferable for use as display units of electronic apparatuses which may be portable terminals including cellular phones, PDAs (Personal Digital Assistants), etc. whose overall assemblies are required to be low in profile.

Figure 17:
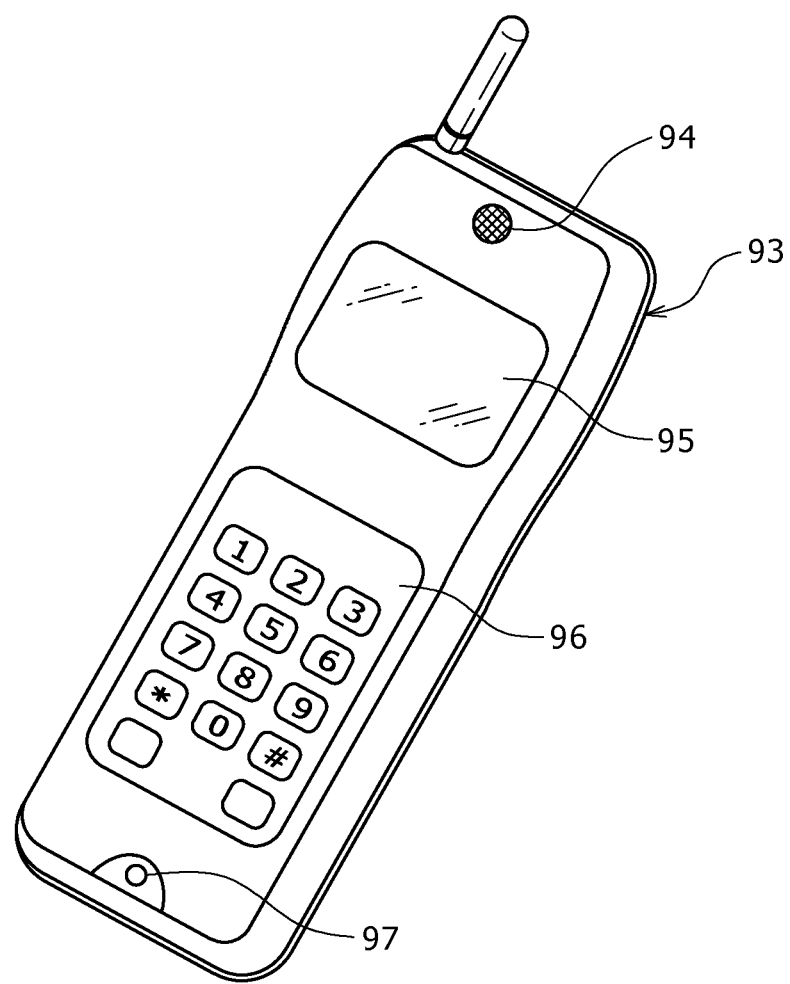
FIG. 17 is a perspective view of a cellular phone as a portable electronic apparatus which can incorporate a display device according to an embodiment of the present invention.

FIG. 17 shows in perspective a portable terminal as a cellular phone which can incorporate a display device according to an embodiment of the present invention.

As shown in FIG. 17, the cellular phone has a speaker 94, a display unit 95, a control pad 96, and a microphone 97 which are mounted on a front face of a casing 93 and arranged in a downward succession. The display unit 95 may include the display device 1, 1A, or 2.

Since the cellular phone incorporates the display device according to the present invention, the overall assembly thereof can be of a low profile because the display device is of a low profile.

Although certain preferred embodiments of the present invention have been shown and described in detail, it should be understood that various changes and modifications may be made therein without departing from the scope of the appended claims.

What is claimed is:

1. A method of manufacturing a display device having a first substrate with a pixel switch and drivers mounted thereon, a second substrate disposed in facing relation to said first substrate, and a material layer held between said first substrate and said second substrate and sealed by a seal member, the method comprising:
    a first step of mounting a semiconductor chip having a control system configured to control said drivers, as a COG component on said first substrate parallel to a region in which said seal member and said second substrate are stacked;
    a second step of securing said first substrate and said semiconductor chip to each other; and
    a third step of simultaneously polishing said second substrate and said semiconductor chip to the same thickness as each other.

* * * * *